US010674588B2

(12) United States Patent
Kelly et al.

(10) Patent No.: US 10,674,588 B2
(45) Date of Patent: Jun. 2, 2020

(54) DEVICE WITH LIGHTING, LOCATION AND COMMUNICATION SERVICES

(71) Applicant: LightUpToys.com LLC, Sellersburg, IN (US)

(72) Inventors: Joshua Kelly, Sellersburg, IN (US); Max Armendariz Lalama, Georgetown, IN (US); Christopher Kelly, New Albany, IN (US); Macaulay Bruton, Jeffersonville, IN (US)

(73) Assignee: LIGHTUPTOYS.COM LLC, Sellersburg, IN (US)

( * ) Notice: Subject to any disclaimer, the term of this patent is extended or adjusted under 35 U.S.C. 154(b) by 0 days.

(21) Appl. No.: 15/982,405

(22) Filed: May 17, 2018

(65) Prior Publication Data

US 2018/0270931 A1 Sep. 20, 2018

Related U.S. Application Data

(63) Continuation-in-part of application No. 14/750,896, filed on Jun. 25, 2015, now abandoned.

(51) Int. Cl.

| | |
|---|---|
| *H05B 47/155* | (2020.01) |
| *G06T 13/80* | (2011.01) |
| *A44C 15/00* | (2006.01) |
| *A44C 25/00* | (2006.01) |
| *H05B 45/10* | (2020.01) |
| *H05B 45/20* | (2020.01) |
| *F21V 33/00* | (2006.01) |

(Continued)

(52) U.S. Cl.
CPC ............ *H05B 47/155* (2020.01); *A44C 15/00* (2013.01); *A44C 15/005* (2013.01); *A44C 15/0015* (2013.01); *A44C 25/001* (2013.01); *F21V 33/0004* (2013.01); *G02B 6/006* (2013.01); *G02B 6/0076* (2013.01); *G06T 13/80* (2013.01); *H05B 33/12* (2013.01); *H05B 45/10* (2020.01); *H05B 45/20* (2020.01); *H05B 47/105* (2020.01); *F21Y 2115/10* (2016.08); *F21Y 2115/20* (2016.08)

(58) Field of Classification Search
None
See application file for complete search history.

(56) References Cited

U.S. PATENT DOCUMENTS

| | | | | |
|---|---|---|---|---|
| 7,942,543 B2 * | 5/2011 | Ritter | ...................... | A42B 1/244 315/307 |
| 2006/0097660 A1 * | 5/2006 | Scott | .................. | H05B 37/0272 315/291 |

(Continued)

*Primary Examiner* — Crystal L Hammond
(74) *Attorney, Agent, or Firm* — Scott R. Cox

(57) ABSTRACT

A device with lighting creating the appearance of animations is disclosed herein. The device includes: a first layer of translucent material and a second layer of translucent material, where the first and second layers of translucent material are attached to form a combined piece of translucent material, and where a first image is etched into the first layer and a second image is etched into the second layer; a housing unit including a first LED used solely with the first layer and a second LED used solely with the second layer; control circuitry connected to the first and the second LEDs; and a power source connected to the control circuitry.

20 Claims, 10 Drawing Sheets

(51) Int. Cl.
*F21V 8/00* (2006.01)
*H05B 47/105* (2020.01)
*H05B 33/12* (2006.01)
*F21Y 115/10* (2016.01)
*F21Y 115/20* (2016.01)

(56) References Cited

U.S. PATENT DOCUMENTS

2013/0306738 A1* 11/2013 Peterson ............ H05B 37/0227
                                                          235/492
2014/0354153 A1* 12/2014 Pulido, Jr. .......... H05B 33/0854
                                                          315/77
2016/0100471 A1*  4/2016 Van De Sluis .... H05B 37/0227
                                                          315/152

* cited by examiner

DEVICE WITH LIGHTING, LOCATION AND COMMUNICATION SERVICES

BACKGROUND OF THE INVENTION

The present invention relates to the field of entertainment devices. More particularly, the present invention relates to the field of entertainment devices that utilize electronics, and lighting, location, and communication system(s). In at least one embodiment described herein an animated device with lighting and the appearance of flip style animations is disclosed.

SUMMARY

In one aspect an apparatus is disclosed including a first layer of translucent material and a second layer of translucent material, where the first and second layers of translucent material are combined to form a combined piece of translucent material, and where a first image is etched into the first layer and a second image is etched into the second layer; a housing unit, where the housing unit includes a first LED used solely with the first layer and a second LED used solely with the second layer; control circuitry connected to the first and the second LEDs; and a power source connected to the control circuitry.

In some embodiments, the apparatus also includes a third layer of translucent material, where the third layer of translucent material is attached to the combined piece of translucent material, forming a further combined piece of translucent material, and where one or more additional images are etched into the third layer; and a third LED included in the housing unit used solely with the third layer of translucent material.

In some embodiments, the control circuitry signals to the first and second LEDs to light in sequence such that an appearance of animation of the first and second image is produced. In other embodiments, the control circuitry signals to the first, second, and third LEDs to light in sequence such that an appearance of animation of the first, second, and third image is produced.

In some embodiments, the first and second translucent materials are selected from a group consisting of: glass, plexiglass, acrylic, or resin. In other embodiments, the first and second images are selected from a group consisting of: a piece of text, a logo, a slogan, or a character. In still other embodiments, the first and second images include one or more colors.

In some embodiments, the power source is a battery and the housing further includes a closable battery compartment.

In some embodiments, the apparatus is configured to be worn by a user. In other embodiments, the apparatus is configured to be worn around a neck of the user.

In some embodiments, the apparatus further includes a tracking apparatus coupled with the housing unit, where the tracking apparatus may receive one or more external signals used to control the first and second LEDs.

In another aspect, an apparatus is disclosed including a first layer of translucent material, a second layer of translucent material, and a third layer of translucent material; where the first, second, and third layers of translucent material are attached to form a combined piece of translucent material, and where a first image is etched into the first layer, a second image is etched into the second layer, and a third image is etched into the third layer; a housing unit, where the housing unit includes a first LED used solely with the first layer, a second LED used solely with the second layer, and a third LED used solely with the third layer; control circuitry connected to the first, the second, and the third LEDs, where the control circuitry signals to the first, second, and third LEDs to light in a sequence such that an appearance of animation of the first, second, and third images is produced; and a power source connected to the control circuitry.

In some embodiments, the sequence includes consistent timing of the first, second, and third LEDs. In other embodiments, the sequence includes variable timing of the first, second, and third LEDs. In still other embodiments, the sequence includes dimming of the first, second, and third LEDs.

In yet another aspect, a necklace is disclosed that includes a pendant positioned on a neckpiece, the pendant including: a first layer of translucent material, a second layer of translucent material, and a third layer of translucent material, where the first, second, and third layers of translucent material are attached to form a combined piece of translucent material, and where a first image is etched into the first layer, a second image is etched into the second layer, and a third image is etched into the third layer, a housing unit, where the housing unit includes a first LED associated with the first layer, a second LED associated with the second layer, and a third LED associated with the third layer, control circuitry connected to the first, the second, and the third LEDs, where the control circuitry signals to the first, second, and third LEDs to light in sequence such that an appearance of animation of the first, second, and third images is produced; a power source connected to the control circuitry; where the control circuity includes a receiver and a proximity detection device, the control circuitry operable to detect a first signal location proximate to a first proximity beacon and illuminate the first, second and third LEDs in a first predefined sequence associated with the first signal location; and where the control circuitry is further operable to detect a second signal location proximate to a second proximity beacon and illuminate the first, second and third LEDs in a second predefined sequence associated with the second signal location, wherein the first predefined sequence is different than the second predefined sequence.

DETAILED DESCRIPTION

Figure 1:
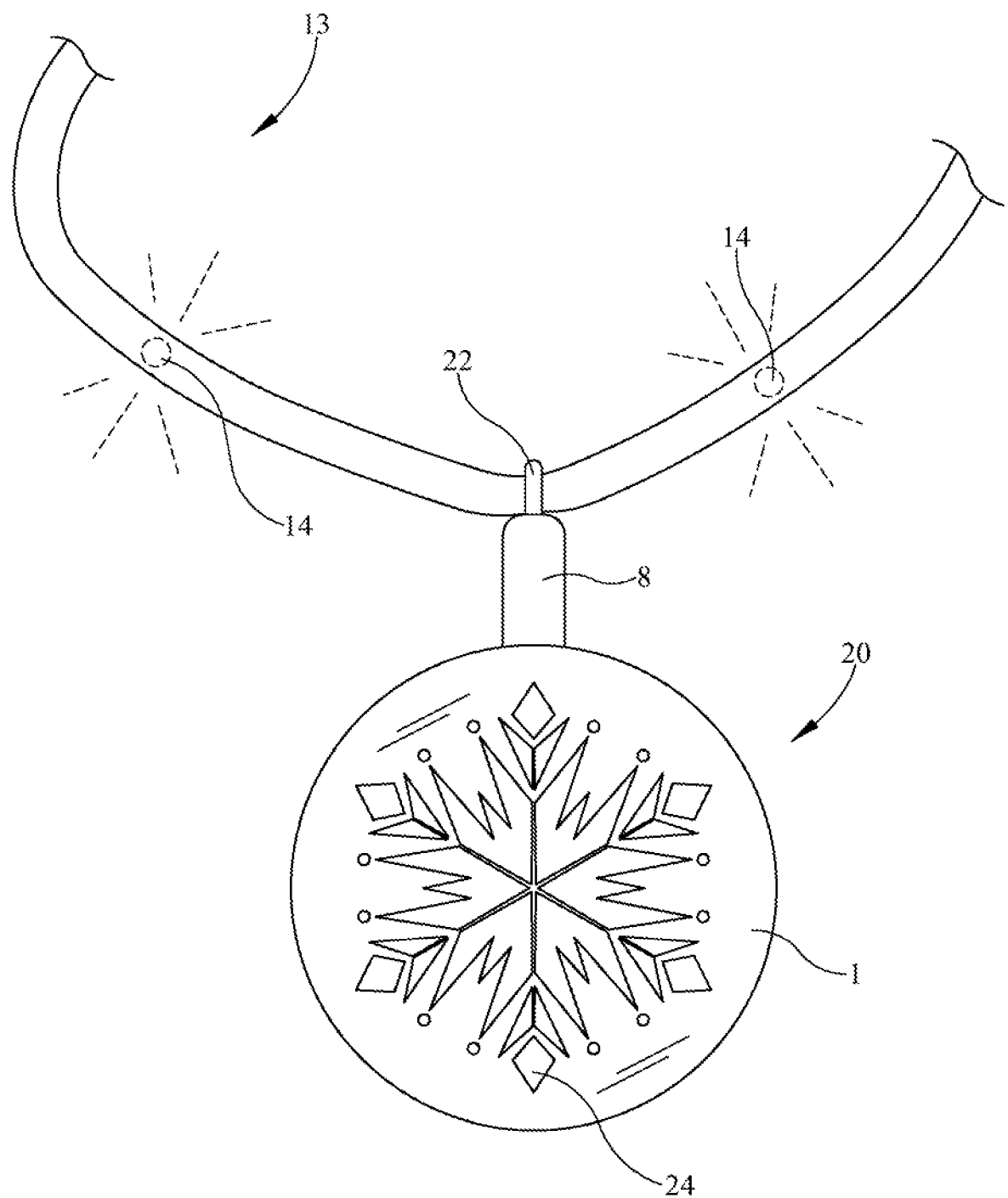
FIG. 1 illustrates an embodiment of an illuminated pendant connected to an illuminated accessory with a first image displayed consistent with the description herein.
Figure 2:
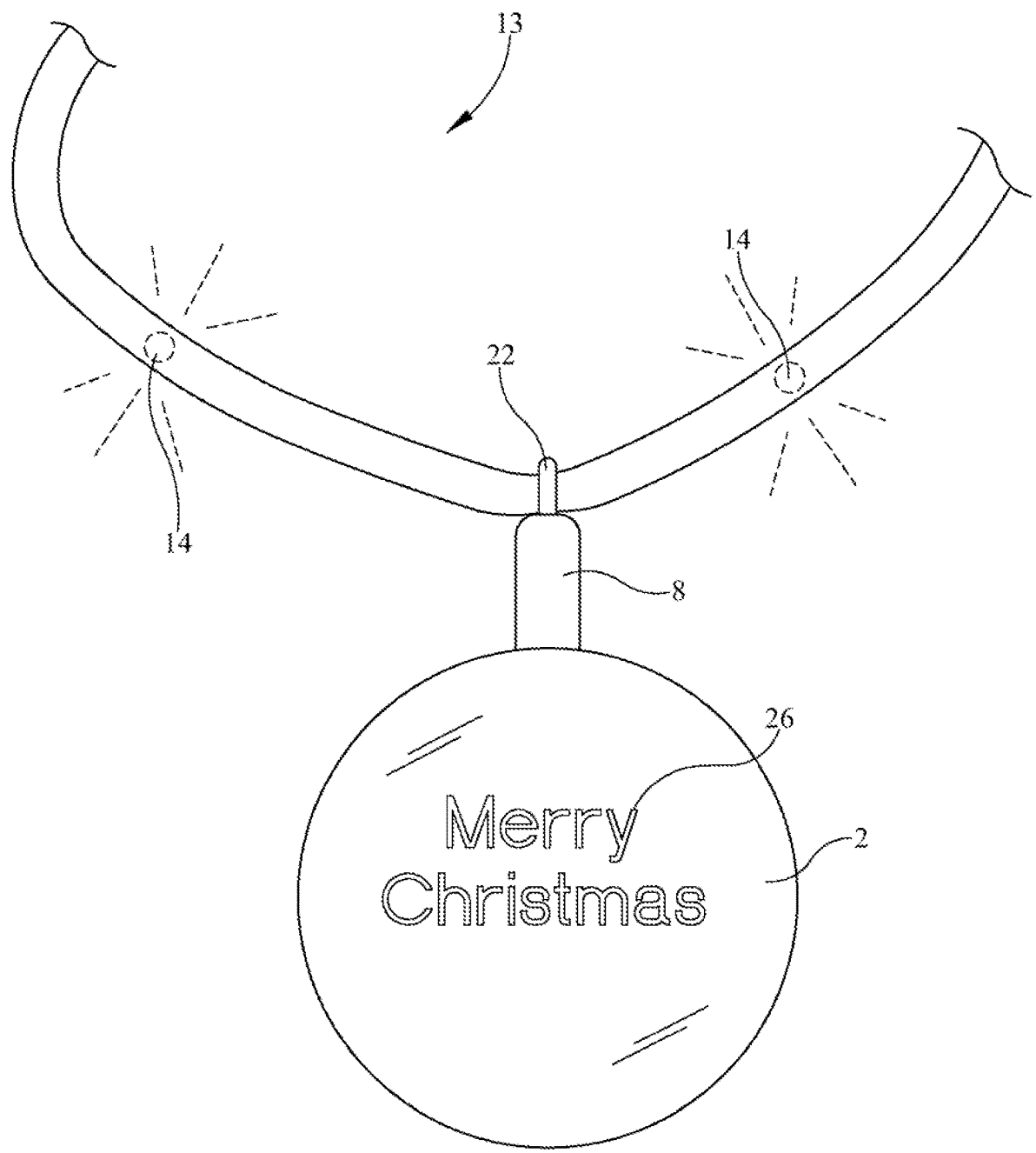
FIG. 2 illustrates the illuminated pendant connected to an illuminated accessory of FIG. 1 with a second image displayed consistent with the description herein.
Figure 3:
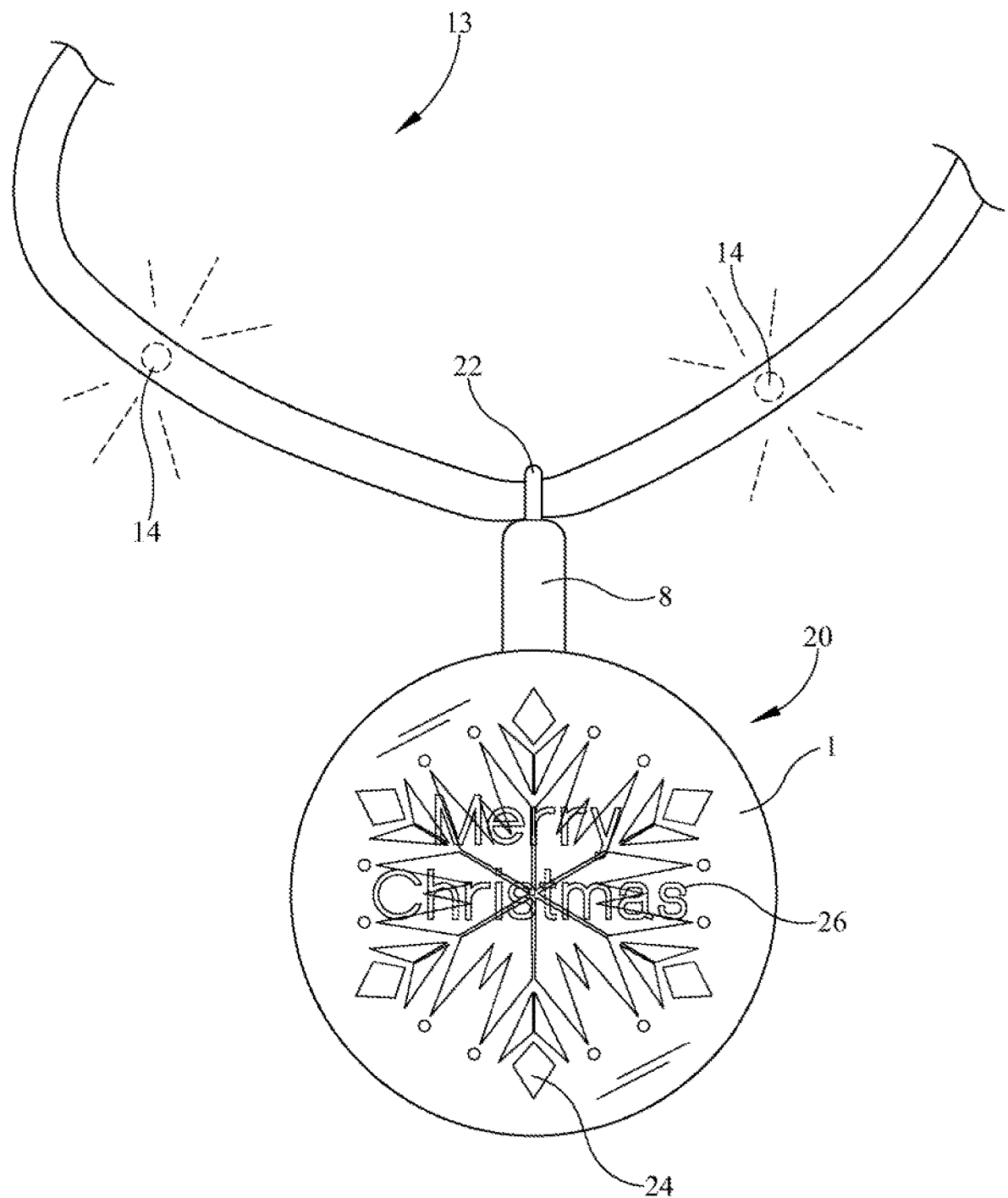
FIG. 3 illustrates the illuminated pendant connected to an illuminated accessory of FIG. 1 transitioning between the first image and the second image consistent with the description herein.

FIGS. 1-3 illustrate an exemplary embodiment of an illuminated pendant 20 utilizing aspects and features as disclosed herein. The illuminated pendant 20 is connected to an illuminated accessory 13, where varying images on the pendant create an appearance of animation. The illuminated pendant 20 includes a front face 1, which displays one or more illuminated images (discussed in further detail herein), and a housing unit 8, which may contain various electrical components necessary for the operation of the illuminated pendant 20. In some embodiments, the housing unit 8 may further comprise a connecting loop 22 that allows the illuminated pendant 20 to be connected to the illuminated accessory 13. In other embodiments, the pendant 20 and the illuminated accessory 13 may be connected by other means, including but not limited to, being integrally molded together, welded together, snapped or buttoned together, connected via magnets, or the like. In still other embodiments, the pendant 20 may not be connected to an illuminated accessory at all and may stand-alone.

Referring now specifically to FIG. 1, the pendant 20 includes a first image 24, a snowflake, illuminated and visible on the front face 1. In contrast, in FIG. 2 the pendant 20 includes a second image 26, the text "Merry Christmas", which is also illuminated and visible on the front face 1. FIG. 3 illustrates the transition period between the first imagine 24 and the second image 26 where both images may be visible. As will be described in greater detail herein, a plurality of light emitting diodes (LEDs) and layers of translucent material are used to create an appearance of animation between the first image 24 and the second image 26. In some embodiments, the transition period between the first image 24 and the second image 26 illustrated in FIG. 3 may be quite brief, for example a fraction of a second, in order to provide an appearance of animated movement between the two or more illustrated images.

Where present, the illuminated accessory 13 may operate independently from or in conjunction with the pendant 20. In some embodiments, the illuminated accessory 13 may include a light string system, with one or more LEDs 14. In other instances, the illuminated accessory 13 may include an electroluminescence assembly, with an electroluminescent wire, sheet, panel, or tape, and/or an inverter. The illuminated accessory 13 may have a power source independent from the power source of the pendant 20 (not visible in FIGS. 1-3, see FIG. 10) or, in some instances may share a power source with the pendant 20. This power source may be a battery or other device connected to a printed circuit board. The illuminated accessory 13 may be constructed of a pliable material, including but not limited to plastic, thermoplastic, cloth, fabric, wire, rubber, metal, elastic polymer, or other similar material that can support the pendant and which can be utilized to extend around the neck of a wearer while supporting the pendant. The illuminated accessory 13 may also be constructed of any translucent, transparent or other material and may be constructed so as to be flexible or inflexible. In some embodiments, the a light string system may be constructed within the illuminated accessory and may include an illumination or lamp system electrically connected together with conductive wire or other electrically connective material; each illumination device, lighting or lamp system may further, in some embodiments, include a light assembly and a socket assembly. In various implementations, the light string system and/or the electroluminescence assembly may be connected to the LEDs 14, power source, and associated circuitry used to control the illuminated accessory 13. The associated circuitry of the illuminated accessory 13 controlling the LEDs 14 and/or electroluminescence assembly may also be used to control the light patterns produced by the various illumination devices or lighting units of both the accessory 13 and the pendant 20. In some embodiments, the light pattern on the illuminated accessory 13 may be random, regular, a controlled sequence or pattern, a custom sequence or pattern, and/or sequence or pattern that incorporates constant timing, variable timing, and/or dimming function. In some instances, the pattern or light sequence of LEDs 14 may be utilized in addition or in place of an the electroluminescence assembly and either may be utilized to provide illumination which is coordinated with the pattern or light sequences of the pendant 20.

Figure 4:
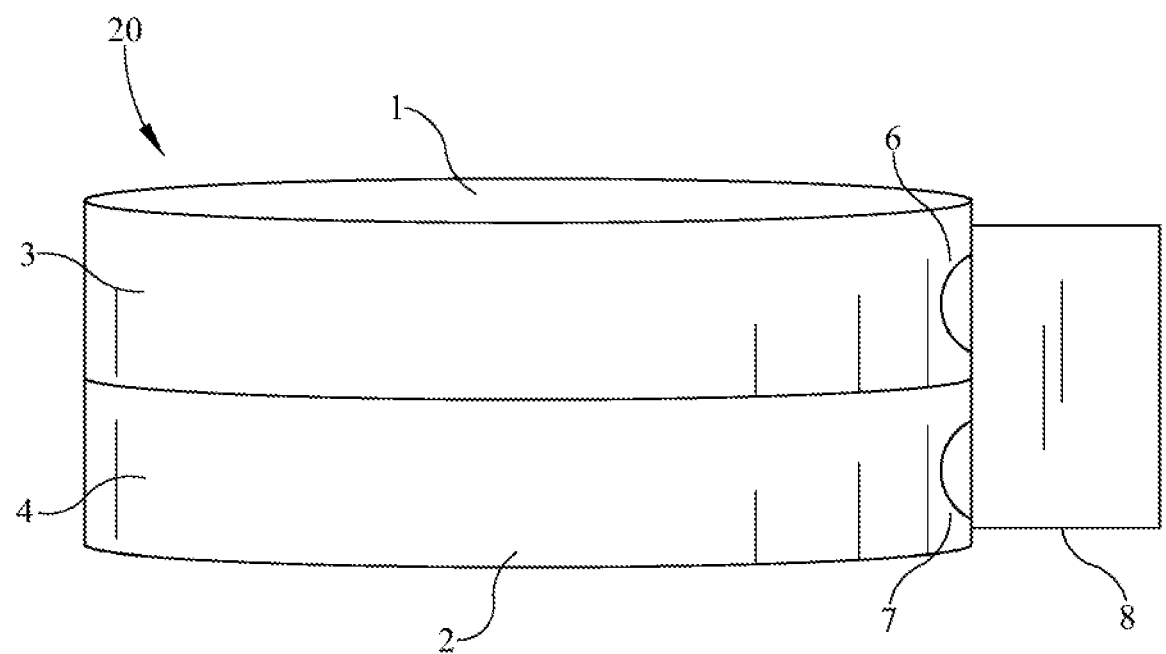
FIG. 4 illustrates a side view of an embodiment of a pendant consistent with the description herein.
Figure 5:
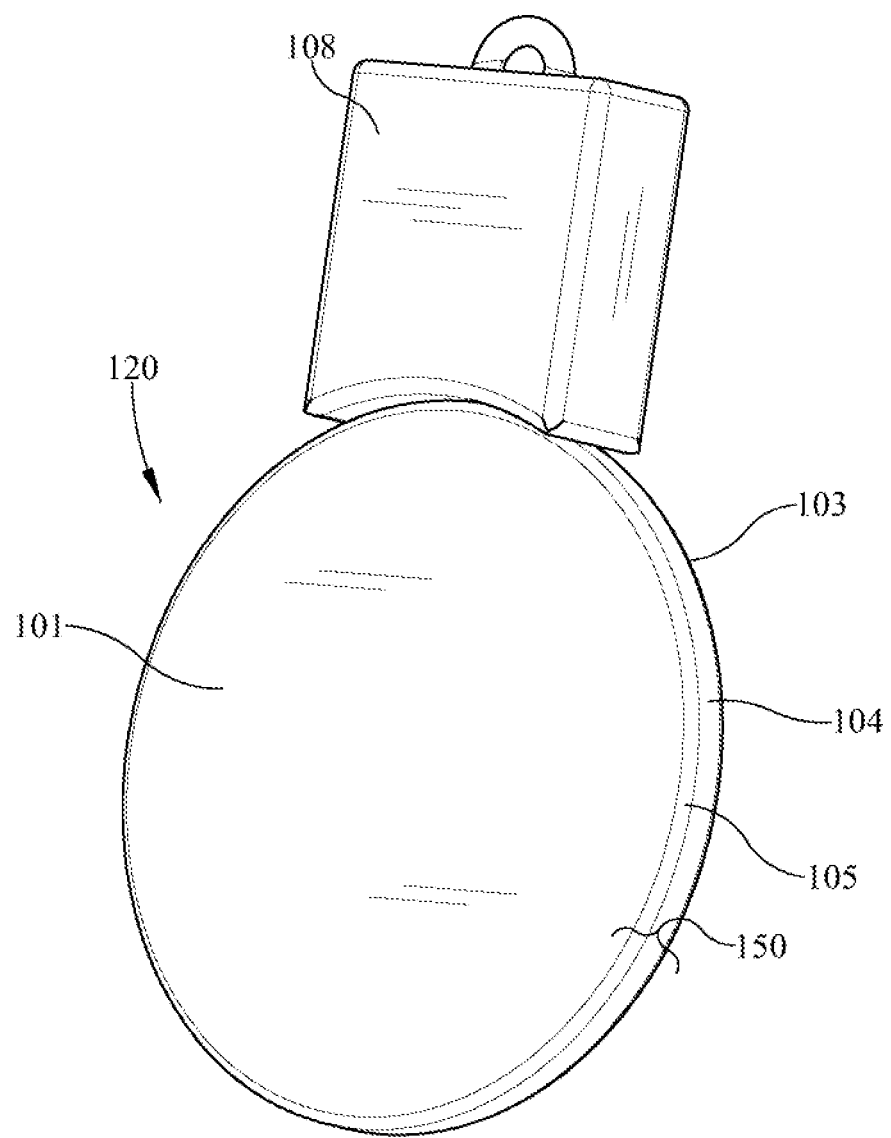
FIG. 5 illustrates a front perspective view of another embodiment of a pendant consistent with the description herein.

FIG. 4 illustrates a side view of an embodiment of the pendant 20. In the embodiment illustrated in FIG. 4, the pendent 20 may be formed of a first layer 3 and a second layer 4 and may include a front face 1 and a rear face 2. However, this is not intended to be limiting, as in some embodiments the pendant 20 may be formed of three or more layers, as exemplified in FIGS. 5-6. Each layer 3, 4 may be constructed of a translucent or transparent material capable of transmitting and/or radiating light. For example, in some embodiments, the translucent material may include but not be limited to, glass, plexiglass, acrylic, resin, and/or a combination thereof. Each layer 3, 4 of the pendant may have a light reflective image 24, 26 contained in and/or on the translucent material. In some embodiments, the image may be etched, sandblasted, molded, engraved, imprinted, ingrained, cut, impressed and/or outlined into or on the translucent material forming a light radiating portion. Further, such images may be produced by embedding other reflective, refractive or other material within the layer. For example, the layers may be molded with specific placement of a refractive material contained therein. Also for example, the material may be molded first and then laser etched. Alternatively, each layer may be produced separately, images positioned or formed thereon and then combined later. Although generally referred to herein as "images" this is not to be understood as limiting, as the image may be text (e.g. "Merry Christmas"), logos, slogans, characters, and/or other visual content. Since both the first layer 3 and the second layer 4 are constructed of a translucent or transparent material, in some examples, the images contained within, or on, each image may be visible from both the front face 1 and the rear face 2 when illuminated.

The first layer of translucent material 3 may be connected to or positioned adjacent of a first LED 6, which may be designed to be used in connection with illumination of the first layer 3 of material. Similarly, the second layer of material 2 may be connected to or positioned adjacent of to second LED 7, which may be designed to be used in connection with the second layer 4 of translucent material. These LEDs 6, 7 may direct light into or through the layers of transparent materials 3, 4. By using each LED 6, 7 either alone or in combination with with their respective layers 3, 4, an appearance of animation may be created by switching between the LEDs 6, 7 as is described in detail herein. In some embodiments, LEDs 6, 7 may be housed within the housing unit 8, and then coupled with the layers 3, 4 of the pendant 20.

By coupled, it is meant that the LEDs may be in illuminating engagement with the layers 3, 4 and not necessarily be mechanically connected. For example, the LEDs may be positioned directly adjacent to an edge of the layers. In other examples, the LEDs may be positioned directly adjacent to the layers and utilized directional optics to focus emitted light from the LEDs into the layers. Also for example, the LEDs may be embedded within the layers and/or in combination therewith utilize reflective optics, reflectors, directional lenses and the like to implement illumination of the respective layer.

In some implementations, the LEDs 6, 7 may be integrated into the layers of translucent material 3, 4 by cutting a hole into each layer 3, 4 or by forming an opening during molding, in which each LEDs 6, 7 may be placed. The sides may then be covered with a non-translucent material so that the majority of light emitted from the LEDs 6, 7 is transmitted through the corresponding layer of translucent material 3, 4. The housing unit 8 may further include circuitry associated with and/or used to control the LEDs 6, 7 and a power source. This circuitry may be used to control the light patterns of the LEDs 6, 7 and may include a printed circuit board having an embedded LED controller which may control various characteristics of the LEDs in the pendant and/or in combination with the accessory. In implementations, the control circuitry may include functional control of the LED intensity, color temperature, color, illumination duration and timing. Such control may further include control modulation such as, for example, frequency or amplitude modulation. In some embodiments, the control of the light patterns may be random or regular, or they may be a controlled and continuous sequence or pattern, a custom sequence or pattern, and/or sequence or pattern that incorporates constant timing, variable timing, and/or dimming. The housing unit 8 may also include a switch or other circuit activating or deactivating the device (see FIGS. 7 and 8). The switch or other circuit for activating or deactivating the device may be mechanical, such as a toggle switch, depression switch, three-position switch and other similar mechanical activation assemblies. The switch or other circuit may also incorporate activation through embedded instructions and or receipt of activation signals received by the housing unit and included electronics and circuitry. For example, the housing unit may include a receiver for receiving signals which may activate the illumination features of the device. The switch or other circuit may further incorporate proximity detection devices, such as for example RFID or other types of electronics which senses location, proximity or other wireless instructions which would indicate or instruct illumination. Such device may include instructions and circuitry operable to detect location in respect to a transmitted beacon. For example, the device may automatically activate upon nearing a display, feature, attraction or other location within an amusement park which is transmitting a unique beacon which, when received by the device, causes the device to illuminate in a predetermined manner. Other automated instructions may further be implemented such as emitting colors, playing predefined audio stored in memory of the device or received by the receiver of the device, playing signals which are streamed and received by the integrated receiver, and similar functionality.

For example, the device may include a proximity detection which includes a blu-tooth beacon receiver. Upon receipt of a unique beacon signal, the device may be programmed by instructions stored in memory to activate in a particular manner and/or play specific pre-recorded or streamed audio signals. Alternatively, the device may incorporate RFID detectors wherein the device, upon recognition of a specific RFID signal, begins emitting a predetermined sequence of signals. Other implementations may be implemented such as GPS location detection and determination.

In some embodiments, the pendant 20 may further include one or more electroluminescent wires, sheets, panels, which may be used in addition to, or in place of, the LEDs 6, 7. Similar to the LEDs 6, 7, the one or more electroluminescent wires, sheets, panels, or tape may, in some instances, only be used in connection with one layer of translucent material and may not be shared or used by any other layer of translucent material.

FIGS. 5 through 9 illustrate various views of another embodiment of a pendant 120. The embodiment illustrated in FIGS. 5 through 9 includes three layers of material 103, 104, 105, which collectively form a combined piece of material 150. The material may be transparent, translucent, reflective or refractive or any combination thereof. Similar to the embodiment described with reference to FIG. 4, the pendant 120 may have a front face 101 and a rear face 102. Also, similar to the embodiment described with reference to FIG. 4, each layer of material 103, 104, 105 may be coupled to or connected with an LED located within the housing unit 108. In implementations, there is a separate LED corresponding to each layer 103, 104, 105, and each LED is designated to be used in conjunction with the adjacent layer of material 103, 104, 105 to which it corresponds.

Alternatively or in addition thereto, the layers of material may be translucent, transparent, reflective or refractive or combinations thereof. For example, depending on the desired illumination characteristics, combinations of material may be utilized side by side. For example, a first layer of material have a known refractive index may be positioned adjacent to a second different layer of material having a refractive index different than the first layer. Similarly, additional layers of material may be used with similar or different material characteristics as the first or the second layer or have unique illumination characteristics itself In such a manner, light entering into the respective layer may be controlled and prevented, promoted or partially allowed to transmit into an adjacent layer.

Each layer of translucent material 103, 104, 105 may contain a separate and distinct image etched, engraved, imprinted, cut, impressed, or otherwise present on or in the material forming a light radiating portion. In some embodiments, this image may contain one or more colors. The appearance of animation may be created when a first LED illuminates a first image in a first layer of material, which may then blend into a second image illuminated by a second LED by fading or dimming out the first image while simultaneously fading or dimming in the second image, for example by having each image illuminated at some proportion of the maximum brightness of the respective LED. Alternatively, one image may be completely switched off (e.g. no LED illuminated) and another image completely switched on (e.g. LED illuminated) with no overlap in time. Further, as the LEDs are controlled by circuitry or other PCB located within housing 108, fine illumination control of the multiple layers may be achieved including switching quickly between illumination of the images to provide full animation appearance. Although the creation of an appearance of animation is discussed in terms of a first image and second image this is not intended to be limiting, as there may three, four, five or more images formed on separate or combined layers. For example, in some implementations, the respective layer may include a plurality of images, each of which react to or are illuminated by specific illumination characteristics of the LED. For example, a first material in the first layer may be formed of a material that refracts, reflects or illuminates in light of a first predefined frequency. Further, a second material in the first layer may be formed of a second material that reflects, refracts or illuminates in light of a second predefined frequency. By controlling the output characteristics of the LED in the first layer, the same layer may illuminate two different images. Control of such illumination control characteristics may include control and modification of output frequency, color, modulation, and or intensity, to name a few aspects. Other known control characteristics may be modified in such implementation as well. In some examples, the lighting sequence produced by the LEDs may be a chaser pattern, a blinking pattern, a fixed illumination of a constant brightness, and/or a variable illumination pattern.

Similar to the embodiment discussed with reference to FIG. 4, in some implementations all three layers 103, 104, 105 are constructed a translucent material the image(s) contained within, or on, each layer may be visible from both the front face 101 and the rear face 102, when illuminated by the respective light source.

Figure 6:
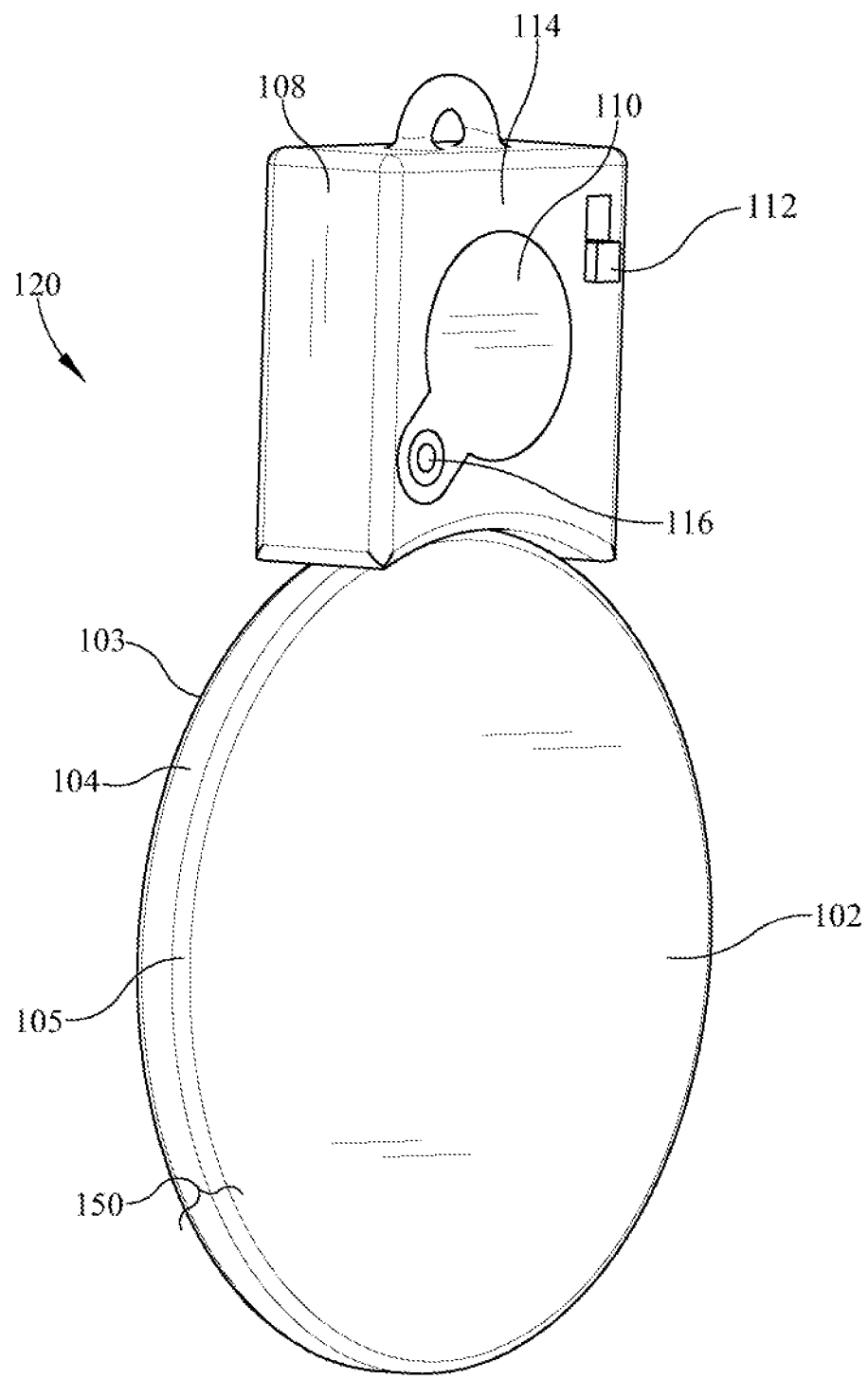
FIG. 6 illustrates a rear perspective view of the pendent of FIG. 5.
Figure 7:
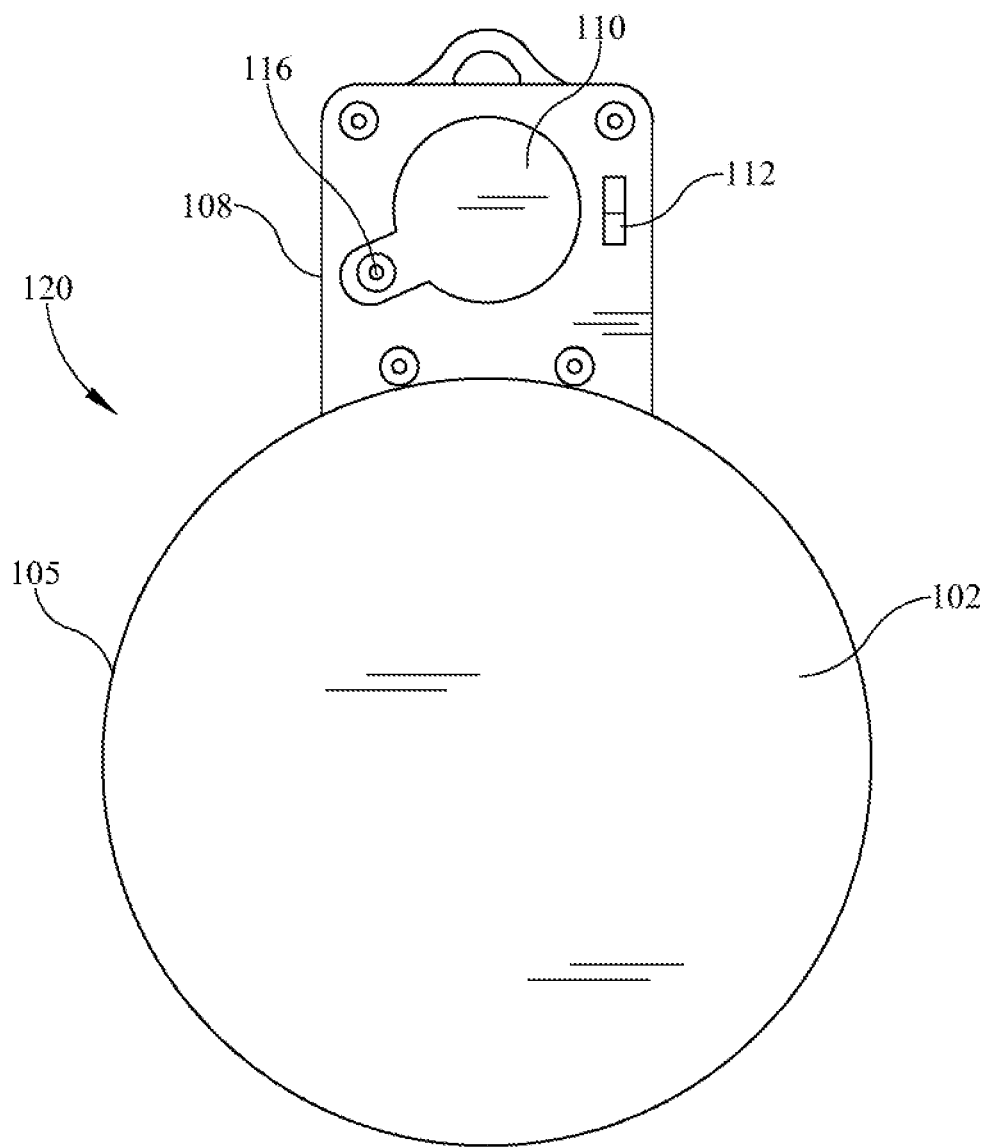
FIG. 7 illustrates a rear view of the pendent of FIG. 5.
Figure 8:
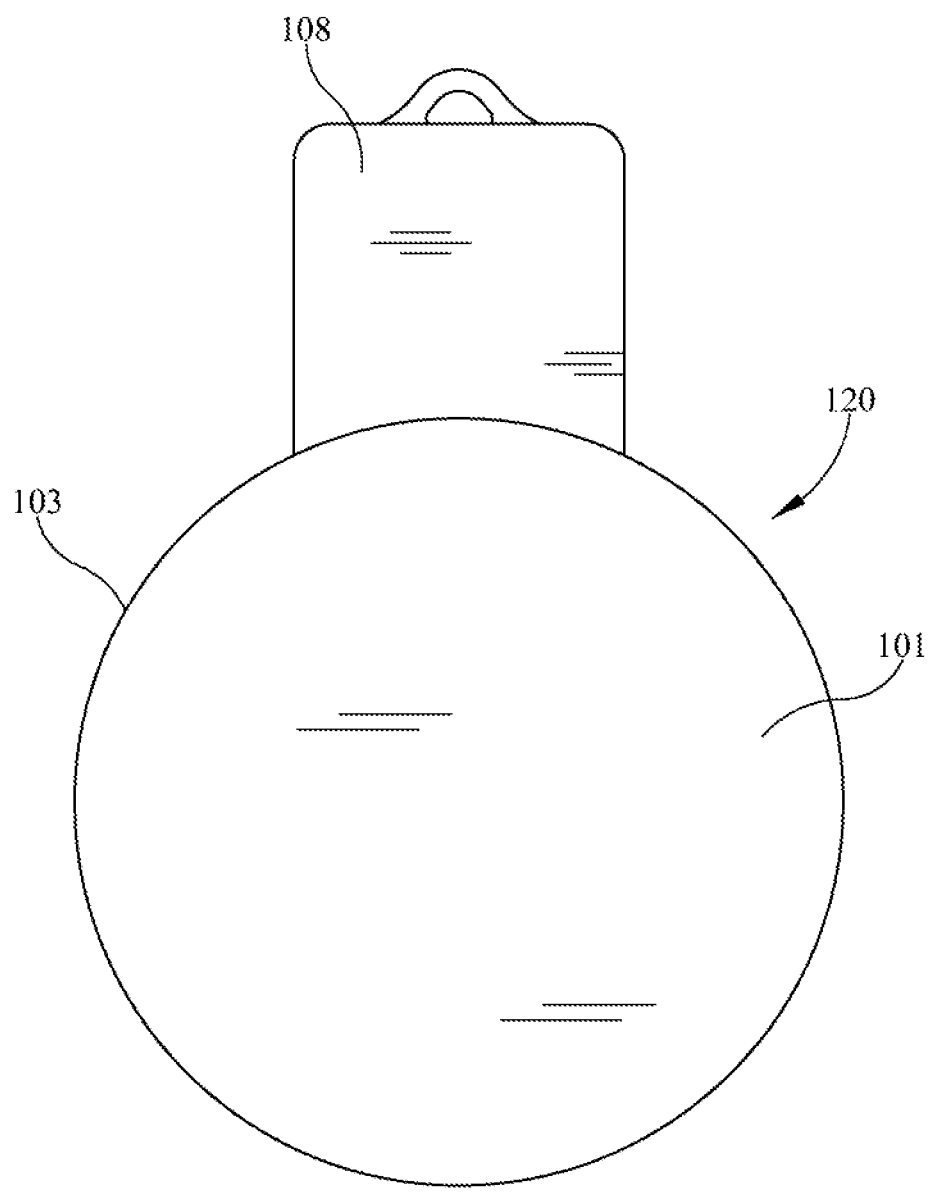
FIG. 8 illustrates a front view of the pendent of FIG. 5
Figure 9:
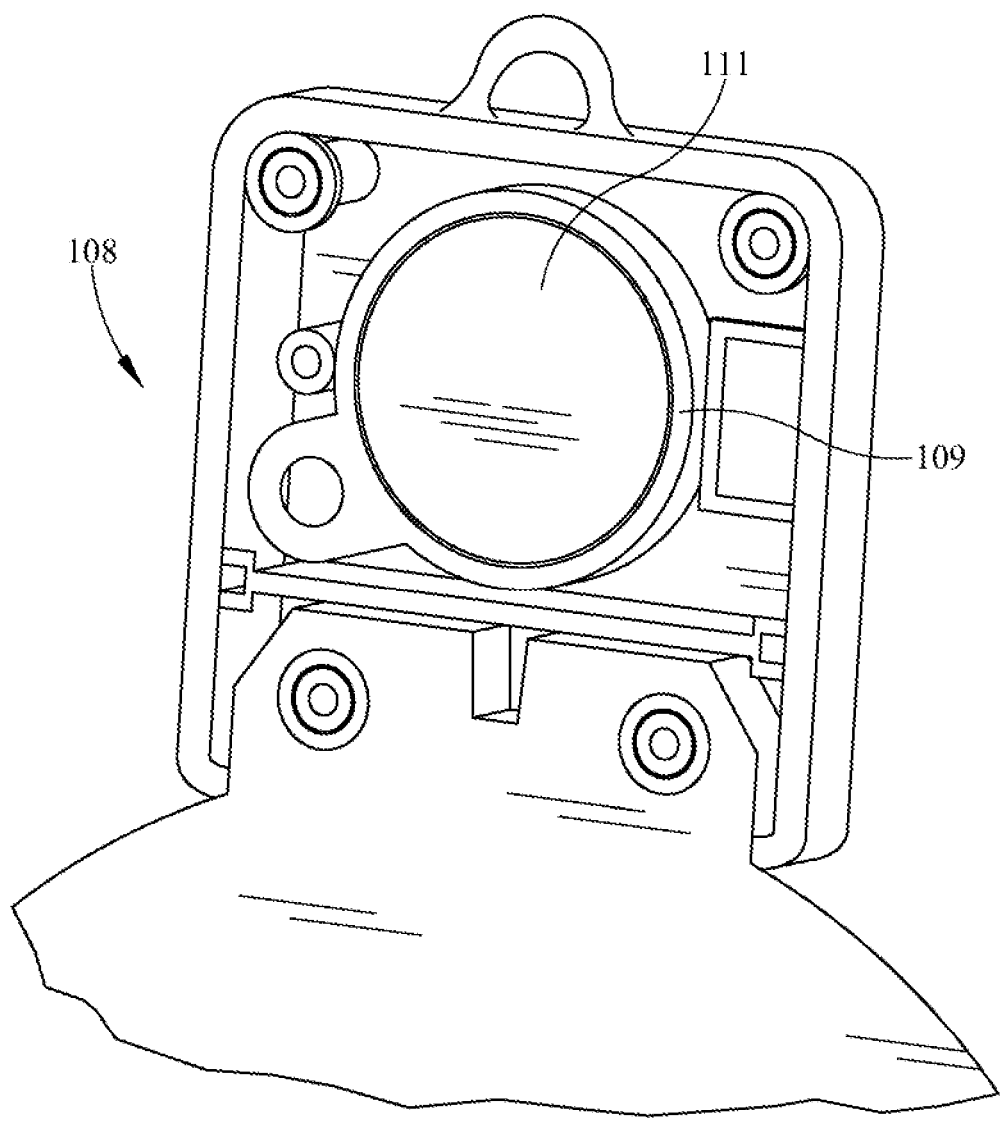
FIG. 9 illustrates a perspective view of the housing unit of the pendent of FIG. 5.

Referring now specifically to the exemplified embodiment of FIGS. 6 and 7, a rear surface 114 of the housing unit 108 is illustrated. In implementations, located on the rear surface 114 of the housing unit 108 may be a battery compartment door 110 and a control switch 112. Other power sources and activation switches may be utilized. In some embodiments, the battery compartment door 110 may be secured through a recessed screw 116. However, this is not intended to be limiting as in other embodiment the battery compartment door 110 may be secured through a snapping mechanism and/or a tension mechanism. When the battery compartment door 110 is opened as is illustrated in FIG. 9, a battery 111 may be exposed for replacement or servicing. In some embodiments, the control switch 112 may be a simple on/off switch; however, in other embodiments the control switch may be a three, four, or more position switch that may allow a user to customize the order, timing, etc. of the sequence of lights. In addition or in place thereof, the switch may be replaced with a software or signal controlled switch that is controlled by the internal controller and circuitry of the housing unit and which may be communicatively activated by a remote device. The switch or other circuit may also incorporate activation through embedded instructions and or receipt of activation signals received by the housing unit and included electronics and circuitry. For example, the housing unit may include a receiver for receiving signals which may activate the illumination features of the device. The switch or other circuit may further incorporate proximity detection devices, such as for example RFID or other types of electronics which senses location, proximity or other wireless instructions which would indicate or instruct illumination.

Figure 10:
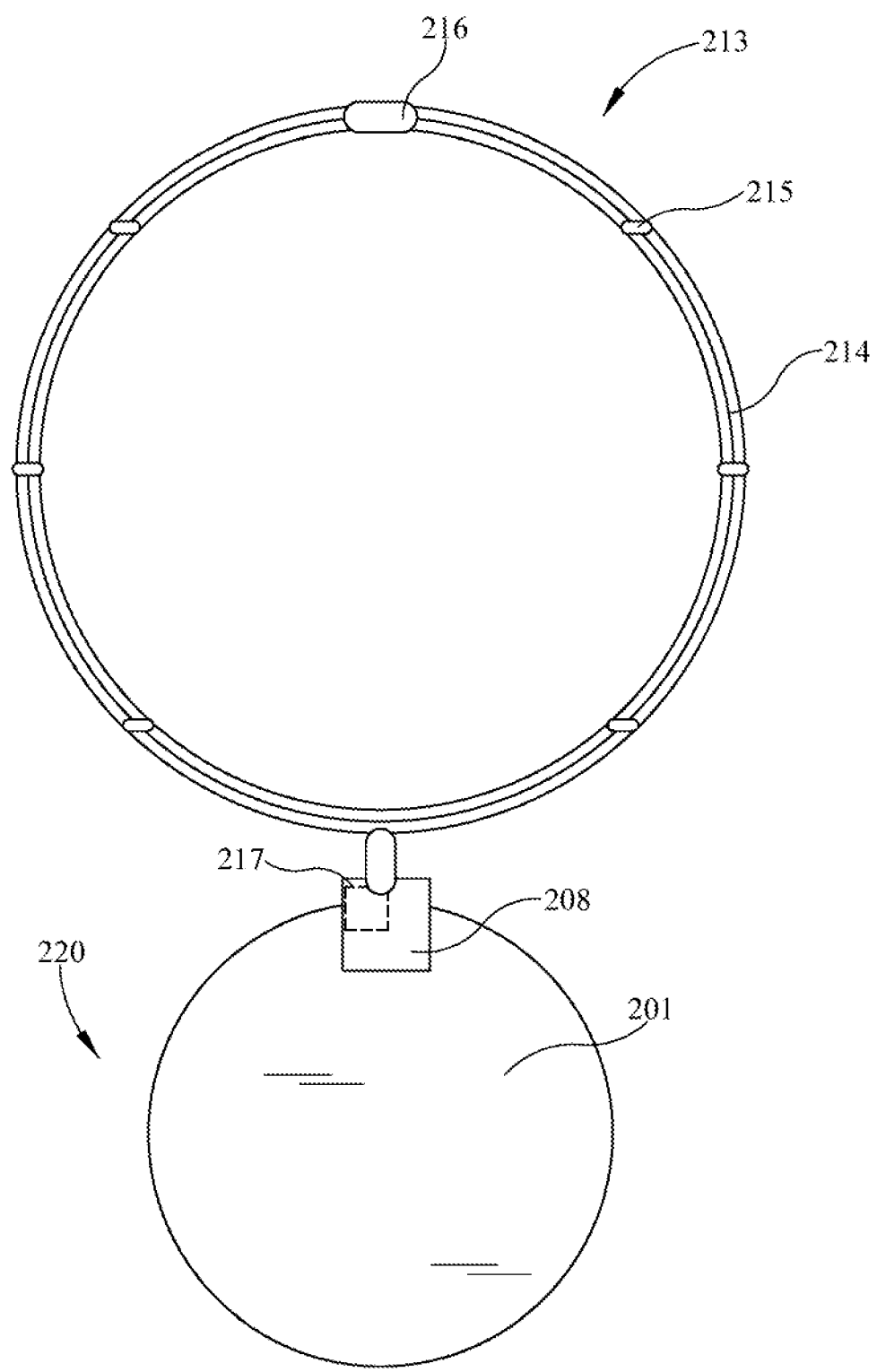
FIG. 10 illustrates a front view of another embodiment of an illuminated pendant connected to an illuminated accessory consistent with the description herein.

FIG. 10 illustrates further features which may be used in addition to or in place of the various features and aspects described herein. For example, the embodiment of an illuminated pendant 220 is shown where the pendant may include a tracking or communication system. The tracking or communication system may include at least one of: a tracking apparatus 217; a communication transmitter/receiver device; at least one of a control device; a power source; a controlling, executing, or operating software application that may be utilized to control or operate a control device or communication transmitter/receiver device; an LED light; a switch or a sensor; circuitry to control an LED light; or a translucent material permitting the transmission of light. The tracking apparatus 217, control device or communication transmitter/receiver device may, if present, receive or transmit various electronic signals, such as GPS, Wi-Fi, radio wave, Bluetooth, RFID, proximity detections signals, audio, vibration, light, sound, or infrared. In various implementations, a communication transmitter/receiver device may be utilized and be in electrical communication with or incorporate therein a tracking apparatus and or associated electronics. The communication receiver or communication transmitter may be located within, or attached to, a controller within the housing 208 or in other positions embedded within the device. Additionally, a control device may be utilized and remote from the device 220, the control device being, in some implementations, a remote control, computer, tablet, smart phone, other smart device, sound device, public address (PA) system, audio system, amplifier system, or one or more speakers. Where present, the remote control device, which may be defined as an electronic device used to wirelessly control another electronic device, may include a button or other signal that when initiated may send a signal to the communication transmitter or receiver device located in the tracking apparatus 217 or other control electronics of the device 220. The controlling, executing, or operating software application may, when instructed to, send a signal from the communication transmitter/receiver (located in the control device) to the device tracking apparatus 217.

As illustrated in FIG. 10, the tracking apparatus 217 may incorporate multiple features noted herein including communication, proximity detection, control and location functions. The tracking apparatus may be within the housing unit 208 of the device along with lighting, location, and communication systems. Alternatively the tracking system 217 may be removably attached via an attaching mechanism (e.g. adhesive, hook and loop, snaps, or the like) to the housing unit 208. The tracking apparatus 217 may be connected to the power source or the circuit activating/deactivating device (e.g. the on/off switch—not illustrated) used to control the LEDs or the electroluminescence assembly, as described herein. The tracking apparatus 217 may be used to facilitate control of the lighting patterns produced by the LEDs.

For example, the apparatus 217 may receive instructions for a localized and specialized illumination sequence when instructed or when proximity to a particular location is detected. Alternatively, complete illumination instructions may be transmitted by a remote controlling device and received by the device 220 based upon the devices location, time of day, or other requirements or characteristics.

In some embodiments, the tracking apparatus 217 or control device housing may also include a speaker, other audio device, or a vibrating device. The control device may send a signal from the communication transmitter/receiver device located in the control device to the communication transmitter/receiver device located in the tracking apparatus 217, resulting in the emission of a sound, vibration, or light from the LEDs or electroluminescence assembly. The switch or sensor may be capable of being connected to other electronics, and in some instances, may be at activated by motion, acceleration, or impact, which may cause the LEDs and control circuitry to remain active for a minimum period of time. Where there is no motion, acceleration, or impact sensed for a minimum period of time, the LEDs and associated control circuitry may enter a low-energy mode to conserve battery; however, sensed motion, acceleration, remote signals or impact may initiate a wake up of the LEDs and associated control circuitry from the low-energy mode.

In other embodiments, a sensor may sense acoustic energy or noise from the environment and convert that acoustic energy or noise into a signal, which may then trigger control of the lighting, or lighting sequence, of the LEDs.

The tracking apparatus may, in addition or in place thereof, include various control electronics such as a PCB, microcontroller, microprocessor, memory and associated electronics such as transmitters, receivers, GPS, blue tooth communication systems, separate controllers, WiFi communication subsystems and the like. The associated memory may further include stored instructions to control and operate the various features hereof, including stored audio files, video files, pre-recorded materials and illumination cycles and shows as well as other necessary instructions to implement the features outlined herein. As well, such control electronics may be alternatively located within the housing and separate from the features of the tracking apparatus. In some embodiments, a single PCB may combine all features and structures/electronics/circuits. In other implementations, such features may be separately implemented.

Returning to FIG. 10, the pendant 220 may be attached or otherwise connected to an illuminated accessory 213. The illuminated accessory 213 may include a light string system 215 with one or more LEDs 214, as well as an illuminated accessory power source 216 to power the illuminated accessory. In some instances, as described previously herein, the illuminated accessory 213 may include an electroluminescence assembly in place of, or as a supplement to, the light string system 215 shown.

It is to be understood that although illustrated in the form of a necklace or lanyard, the illuminated accessory is not so limited, as the illuminated accessory may be worn by a user (as a necklace, bracelet, etc.), attached to other objects, held in a user's hand, used as part of a display, and the like. Furthermore, the illuminated accessory may be formed in any shape, including the shape of eyeglasses, a toy star, toy planet, crystal, sphere, rod, staff, blade, disk, device, wand, multi-sided, polyhedron shape, geometric shape, triangle shape, quadrilateral shape, pentagon shape, hexagon shaped, septagon shaped, octagon shaped, polygon of any number of sides, a commonly recognizable toy(s), or consumer product. In some instances, the illuminated accessory may be in the form of a character, caricature, celebrity or person's shape or image (in whole or part), a logo, symbol, or other recognizable items (e.g. a rocket, airplane, car, animal, bug, plant, rock, rock formation, body part(s), machine, vehicle, boat, alien, wand, sword, knife, gun, pistol, boat, submarine, toy sword, toy vehicle, toy gun, toy shield, toy wand, doll, figurine, action figure, remote controlled vehicle, remote controlled airplane, other remote control toy, hand held toy(s), construction toy(s), toy block(s), accessories, apparel, footwear, hair accessories, jewelry, sports balls or equipment, bike accessories, bike spokes, costumes, headwear, skateboard accessories, wheels, wheel accessories, vehicle accessories, skateboard wheels, snowboard, yo-yo, spinning top, fan, frisbee, nightlight, electronic device, radio, clock radio, mobile phone accessory, and/or desktop device).

It is also to be understood, that although illustrated as a circle, the pendant is not so limited, as it may be any shape including triangular, rectangular, pentagonal, hexagonal, a polygon of any number of sides, or any other geometric shape. Furthermore, the pendant may be incorporated into any number of other devices, toys, or other recognizable items.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A necklace comprising:
    a pendant connected to a neckpiece, the pendant comprising a first layer of translucent material, a second layer of translucent material, and a third layer of translucent material,
        wherein the first, second, and third layers of translucent material are connected collinearly to form a combined piece of translucent material, and
        wherein a first image is etched into the first layer of the combined piece of translucent material, a second image is etched into the second layer of the combined piece of translucent material, and a third image is etched into the third layer of the combined piece of translucent material,
    a housing unit connected to an edge of the combined piece of translucent material, wherein the housing unit comprises a first LED connected to the first layer of the combined piece of translucent material, a second LED connected to the second layer of the combined piece of translucent material, and a third LED connected to the third layer of the combined piece of translucent material,
    control circuitry located within the housing unit connected to the first, the second, and the third LEDs, wherein the control circuitry signals to the first, second, and third LEDs to light in sequence such that an appearance of animation of the first, second, and third images is produced;
    a power source connected to the control circuitry;
    wherein the control circuity comprises a receiver and a proximity detection device, the control circuitry operable to detect a first signal location proximate to a first proximity beacon and illuminate the first, second and third LEDs in a first predefined sequence associated with the first signal location;
    wherein the control circuitry is further operable to detect a second signal location proximate to a second proximity beacon and illuminate the first, second and third LEDs in a second predefined sequence associated with the second signal location, and
    wherein the first predefined sequence is different than the second predefined sequence.

2. The necklace of claim 1, wherein the first, second, and third LEDs comprise different colors.

3. The necklace of claim 1, wherein the control circuitry controls a function of the first, second, and third LEDs selected from the group consisting of intensity, color temperature, color illumination and timing.

4. The necklace of claim 1, further comprising an audio device and/or a vibrating element, wherein the first predefined sequence associated with the first signal location further comprises the activation of the audio device and/or vibrating element.

5. The necklace of claim 4, wherein the second predefined sequence associated with the second signal location further comprises the activation of the audio device and/or vibrating element.

6. The necklace of claim 1, wherein the control circuitry is further operable to detect a third signal location proximate to a third proximity beacon and illuminate the first, second and third LEDs in a third predefined sequence associated with the third signal location, wherein the third predefined sequence is different than the first and second predefined sequence.

7. A neckpiece comprising:
    a pendant connected to the neckpiece, the pendant comprising:
    one or more layers of translucent material;
    a housing unit, wherein the housing unit comprises one or more LEDs associated with the one or more layers of translucent material and an audio device and/or vibrating element;
    control circuitry connected to the one or more LEDs and the audio device and/or vibrating element; and
    a power source connected to the control circuitry;
    wherein the control circuity comprises a receiver and a proximity detection device, wherein the control circuitry is operable to detect a first signal location proximate to a first proximity beacon and illuminate the one or more LEDs and activate the audio device and/or vibrating element in a pattern associated with the first signal location.

8. The neckpiece of claim 7, wherein one or more LEDs comprise different colors.

9. The neckpiece of claim 7, wherein the control circuitry controls a function of the one or more LEDs and the audio device and/or vibrating element selected from the group consisting of intensity, color temperature, color illumination and timing.

10. The neckpiece of claim 7, further comprising a necklace.

11. The neckpiece of claim 7, wherein the control circuitry is further operable to detect a second signal location proximate to a second proximity beacon and illuminate the one or more LEDs and activate the audio device and/or vibrating element in a second pattern associated with the second signal location, wherein the first pattern is different than the second pattern.

12. The neckpiece of claim 7, wherein at least two layers of the one or more layers of translucent material are magnetically connected.

13. A neckpiece comprising:
    a pendant connected to the neckpiece, the pendant comprising:

one or more layers of translucent material;
a housing unit, wherein the housing unit comprises one or more LEDs associated with the one or more layers of translucent material;
control circuitry connected to the one or more LEDs; and
a power source connected to the control circuitry; and
wherein the control circuity comprises a receiver and a proximity detection device, wherein the control circuitry is operable to detect a first signal location proximate to a first proximity beacon and illuminate the one or more LEDs in a pattern associated with the first signal location.

14. The neckpiece of claim 13, wherein the one or more LEDs comprise different colors.

15. The neckpiece of claim 13, wherein the control circuitry controls a function of the one or more LEDs selected from the group consisting of intensity, color temperature, color illumination and timing.

16. The neckpiece of claim 13, further comprising an audio device and/or a vibrating element, wherein the pattern associated with the first signal location comprises the activation of said audio device and/or vibrating element.

17. The neckpiece of claim 13, further comprising a necklace.

18. The neckpiece of claim 13, wherein the control circuitry is further operable to detect a second signal location proximate to a second proximity beacon and illuminate the one or more LEDs in a second pattern associated with the second signal location, wherein the first pattern is different than the second pattern.

19. The neckpiece of claim 13, wherein at least two layers of the one or more layers of translucent material are magnetically connected.

20. The neckpiece of claim 13, wherein the housing unit comprises two or more LEDs associated with the one or more layers of translucent material.

* * * * *